No. 637,049.  
W. C. VAN HORN.  
CRYPTOGRAPHIC CHART.  
(Application filed Nov. 29, 1897.)  
Patented Nov. 14, 1899.

(No Model.)

Witnesses:
M. V. Barlow
Jean Graham

Inventor
Wm. C. Van Horn
By C. W. Graham
Atty.

UNITED STATES PATENT OFFICE.

WILLIAM CAMPBELL VAN HORN, OF HOOPESTON, ILLINOIS.

CRYPTOGRAPHIC CHART.

SPECIFICATION forming part of Letters Patent No. 637,049, dated November 14, 1899.

Application filed November 29, 1897. Serial No. 660,082. (No model.)

*To all whom it may concern:*

Be it known that I, WILLIAM CAMPBELL VAN HORN, a citizen of the United States, residing at Hoopeston, in the county of Vermilion and State of Illinois, have invented new and useful Improvements in Cryptographic Charts, of which the following is a specification.

My invention relates to improvements in cryptographic charts and methods of sending and reading cipher messages, the object of the invention being to provide a chart which can be used in sending and reading secret messages that is entirely devoid of any system except that agreed upon by the parties using the chart, a further object being to provide a chart that can be manufactured in large quantities at a minimum expense and one that can be folded and carried in the pocket and not occupy any more space than an ordinary envelop, a still further object being to provide a chart having an almost unlimited number of combinations and changes, and by using an alphabet, as shown, messages can be sent in any of the leading languages of the world, reference being now had to the accompanying drawings, in which—

Figure 1:
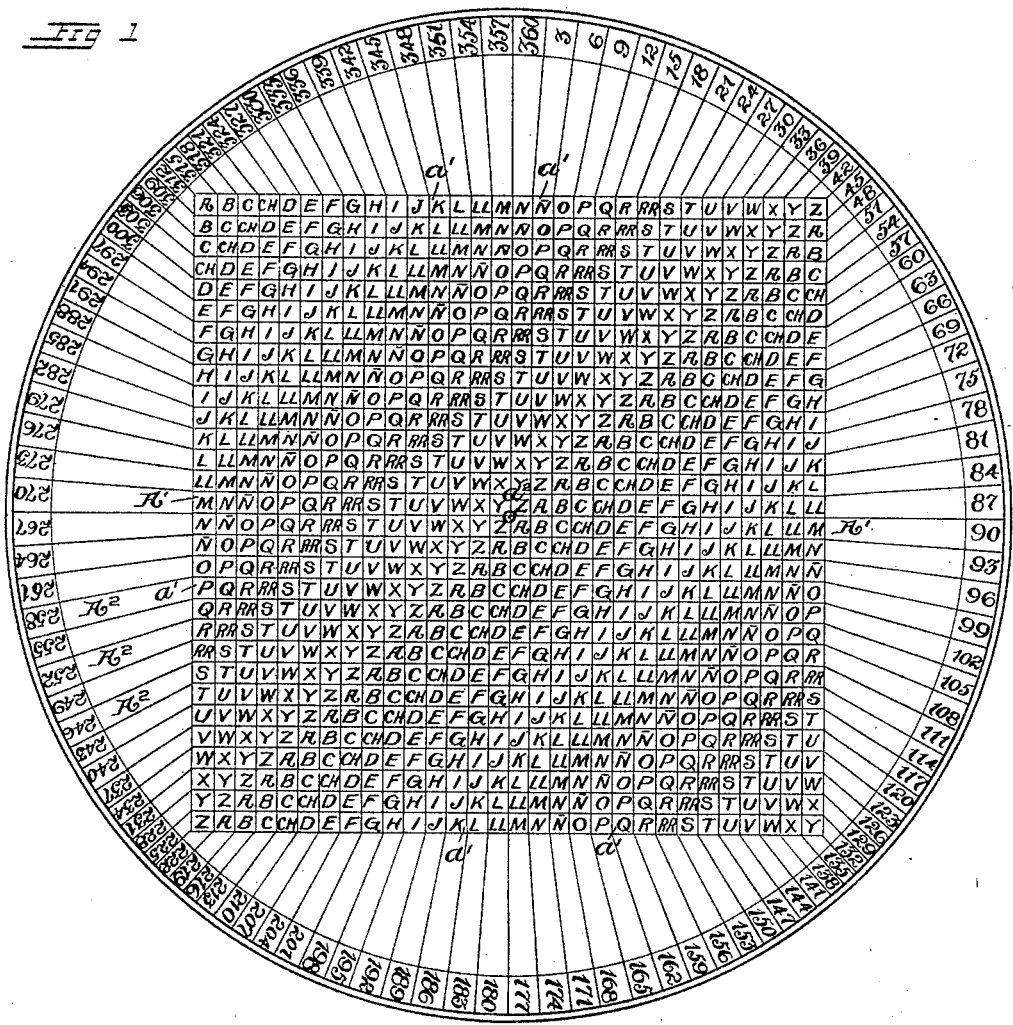
Figure 2:
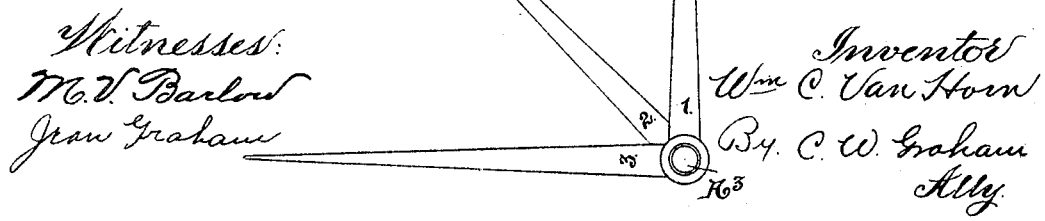

Figure 1 is a plan view showing the arrangement of the alphabet and angles. Fig. 2 is a view of the deciphering compass or tripod which is used in sending and reading the messages.

In Fig. 1 the central portion A' of the chart consists of a number of squares $a'$—in this instance thirty on a side of a large square, making nine hundred squares on the entire chart—each represented by a letter of the alphabet in the manner shown. The radial spaces $A^2$, extending from the squares $a'$ to the outer circle, are each designated by degrees, which, in combination with the alphabet, produce combinations to be hereinafter explained. The tripod or three-legged compass shown in Fig. 2 is capable of adjustment to any desired angle, the three legs being numbered consecutively 1, 2, and 3. The pivot or center $A^3$ is made either of tubing or transparent material, so as to have a visual opening therethrough, the purpose of which will be explained.

I will explain two simple methods of using the chart. Having done that, other combinations and changes will be suggested to any one using the chart.

Suppose A and B wish to communicate by means of cipher messages and each is possessed of a chart and accompanying compass. They must agree upon some word as a key and some angle to set the compass wherewith to read the message. They agree upon the word "JOHN" as a key and ninety degrees to set the compass, using only two legs. In sending this message we will use only the alphabet in the squares. The angle being ninety degrees, the compass is held throughout in one position relative to the squares. The message A wishes to send is the word "GOING." "JOHN" being the key-word and in this instance being read on the top horizontal row of squares, the first letters of the message will be taken from the vertical row having "J" at the top. A places his compass on the chart in such a position that the vertical leg 1 lies on the vertical row having "J" at the top, and locating the open center of the compass directly over the first letter "G" of the message, the leg 3 of the compass will then lie in a horizontal direction on the row of squares having "X" on the left side of the chart, which will be the first letter of the cipher A sends to B. "O" being the next letter in the key-word and "O" being the next letter in the message, A places the center of his compass over the letter "O" on the top row, and the leg 3 points to "A" on the left vertical row, which is the next letter in the cipher. "H" being the next letter in the key and "I" being the next letter in the message, A places the center of his compass over the letter "I" in the vertical row having "H" at the top, and the leg 3 of the compass will point to "B" in the first column on the left, which will be the next letter in the cipher message. "N" being the next letter in the key and "N" being the next letter in the message, A places the center of his compass over "N" in the top row, and the leg 3 will point to the letter "A" at the top of the left or first vertical row, which will be the next letter in the cipher message. Having used all the letters in the key-word, A simply begins at the beginning of the key and proceeds on with the message, so "J" will be the next letter in the key and "G" will be the next letter in the message.

A places the center of his compass over the letter "G" in the column having "J" at the top. The left leg 3 will point to "X" in the row on the left, which is the next letter in the cipher, thus completing the message. The cipher that B receives is "X A B A X," which is unintelligible to any one not knowing the means for reading it. When B receives the message "X A B A X" he takes his chart and compass and proceeds as follows: Knowing the key and the angle for the compass, he places leg 3 of his compass on "X" of the upright column on the left and leg 1 of the compass on the column having "J" (the first letter of the key) at the top, when the center of his compass will rest over the letter "G," and so on B continues to decipher the message.

Another method of using the chart is as follows: A and B agree to set the legs 1 2 3 of the compass so many degrees apart—say three degrees, one hundred and twenty degrees, and two hundred and forty degrees—or, in other words, locating the center of the compass over the center of the chart designated by the small circle $a^2$. Leg 1 will point to three degrees on the circle, leg 2 will point to one hundred and twenty degrees on the circle, and leg 3 to two hundred and forty degrees on the circle. They also agree to read from the legs of the compass in a certain order. For illustration, say leg 1 will be the reading-leg and legs 2 and 3 will be the sending-legs, first sending from leg 2, then leg 3, then again from leg 2, and so on. A in sending the message "G O I N G" would proceed as follows: Laying his compass on the chart so that the center of the compass will cover the small circle $a^2$ on the center of the large square, with leg 1 pointing toward the top, the other legs 2 and 3 will be located as before stated. He now proceeds as follows: Places leg 1, which is the reading-leg, on number "336," which corresponds to the first letter of the message "G." Leg 2 will then point to number "90," which is the first number of the cipher. He next places leg 1 on number "6," which number corresponds to the next letter ("O") in the message, when leg 3 will point to number "243" on the circle, which is the next number in the cipher. He next places leg 1 on number "342," which corresponds to the next letter ("I") in the message, and leg 2 points to number "96," which is the next number in the cipher. He next places leg 1 on number "360," which corresponds to the next letter ("N") in the message, when leg 3 will point to "237," which will be the next number in the cipher. He next places leg 1 on number "336," which corresponds to the next letter ("G") in the message, when leg 2 will point to number "90," which will be the next number in the cipher. The cipher message that B receives is as follows: "90—243—96—237—90." Knowing the angles at which the legs of the compass are set and the order in which they are read, he will proceed as follows to decipher the message: Knowing that the first number was sent from leg 2, he places leg 2 on number "90," when leg 1 will point to number "336," which corresponds to letter "G." He then places leg 3 on number "243," when leg 1 points to number "6," which corresponds to letter "O," and so on he continues until the whole message is read.

Having thus described two methods of using the chart, many other ways will be suggested.

Any other alphabet can be placed on the squares and any series of numbers on the circle. The chart as shown is practically universal, as the alphabet contains all of the letters in the principal languages in general use.

Having thus described my invention, what I claim as new, and desire to secure by Letters Patent, is—

1. A cryptographic chart composing a square space subdivided into a number of smaller spaces, said smaller spaces being designated by letters or characters, radial spaces extending from the smaller spaces and surrounding the four sides of the said square, each of the said radial spaces being designated by a figure or number.

2. A cryptographic chart comprising a series of small spaces grouped to form a complete square, radial spaces extending from the four sides of the said square, the said series of small spaces being designated by letters or characters and the said radial spaces being designated by figures or numbers, a reading instrument having two or more blades capable of any adjustment relative to the letters or characters designating the said small spaces and the said radial spaces.

WILLIAM CAMPBELL VAN HORN.

Witnesses:
J. J. GRAHAM,
S. J. PORTER.